United States Patent
Rao et al.

(10) Patent No.: US 7,840,192 B2
(45) Date of Patent: Nov. 23, 2010

(54) METHOD, SYSTEM, AND DEVICE FOR PROVISIONED TALKGROUP IDENTIFIER DISCOVERY

(75) Inventors: Padakandla Krishna Rao, Kanata (CA); Sing Janus Yau, Ottawa (CA)

(73) Assignee: Research in Motion Limited, Waterloo, Ontario (CA)

( * ) Notice: Subject to any disclaimer, the term of this patent is extended or adjusted under 35 U.S.C. 154(b) by 1584 days.

(21) Appl. No.: 10/787,302

(22) Filed: Feb. 27, 2004

(65) Prior Publication Data

US 2005/0197146 A1    Sep. 8, 2005

(51) Int. Cl.
*H04B 1/38* (2006.01)

(52) U.S. Cl. .................. 455/90.2; 455/515; 455/517; 455/518; 455/519

(58) Field of Classification Search ............... 455/90.2, 455/517–519, 515
See application file for complete search history.

(56) References Cited

U.S. PATENT DOCUMENTS

| | | | |
|---|---|---|---|
| 5,428,823 A | 6/1995 | Ness-Cohn et al. | |
| 5,761,193 A * | 6/1998 | Derango et al. | 370/312 |
| 6,005,848 A | 12/1999 | Grube et al. | 370/266 |
| 6,519,239 B1 | 2/2003 | Panchal et al. | 370/335 |
| 6,763,243 B2 * | 7/2004 | Wolf et al. | 455/519 |
| 6,885,874 B2 * | 4/2005 | Grube et al. | 455/520 |
| 6,999,783 B2 * | 2/2006 | Toyryla et al. | 455/519 |
| 7,319,879 B2 * | 1/2008 | Harris et al. | 455/458 |
| 2003/0083086 A1 | 5/2003 | Toyryla et al. | 455/518 |
| 2003/0186716 A1 * | 10/2003 | Dorenbosch et al. | 455/519 |

FOREIGN PATENT DOCUMENTS

| | | |
|---|---|---|
| EP | 1330138 | 9/2002 |
| EP | 1 330 138 | * 7/2003 |
| JP | 10-308970 | 11/1998 |
| JP | 11-340904 | 12/1999 |
| JP | 2001-168793 | 6/2001 |
| WO | WO 0030375 | 5/2000 |
| WO | WO 03/069946 | 8/2003 |

OTHER PUBLICATIONS

Architecture V1.1.1, Oct. 2003, Publication, Ericsson, Motorola.*
Ericsson, Motorola, Siemens, Nokia, Push to talk over cellular (PoC); User Requirements V1.1.1 (Oct. 2003).*
Motorola iDEN™ Technical Overview. Software Release 9.1; 68P81095E55-E. Motorola, Inc., Aug. 8, 2000, Schaumberg, IL, USA. Retrieved from the Internet: http://www.webaugur.com/matt/files/nextel/techover.pdf.

(Continued)

*Primary Examiner*—Tuan H Nguyen

(57) ABSTRACT

A method, system, and user device are provided for provisioned talkgroup identifier discovery in a dispatch or similar network, in which a user is provided with a list of talkgroups provisioned for the user device. In some embodiments a new request message sent from the user device is implemented to effect a response from the network providing the information. In other embodiments the provision of the information is provided by a new message automatically sent from the network to the user device at a specific time. In yet other embodiments, the user device attempts to join every group to test which groups are provisioned for it.

21 Claims, 7 Drawing Sheets

OTHER PUBLICATIONS

OMA Input Contribution document, (referring to PoC documents) Doc. #OMA-POC-2003-0007Ri- Contributed Specification Suite.

iDEN™ Technical Overview document, 68P81095E55-E (Software Release 9.1.

Push-to-Talk over Cellular (PoC) User Plane; Transport Protocols; PoC Release 1.0, Transport Protocols V1.1.1 (Oct. 2003).

Push to Talk over Cellular (PoC); List Management and Do-not-Disturb; PoC Release 1.0; List Management and Do-not-Disturb V1.1.4 (Oct. 2003).

Push-to-Talk over Cellular (PoC) User Plane; (E)GPRS/UMTS Specification; PoC Release 1.0; (E)GPRS/UMTS Specification V1.1.1 (Oct. 2003).

Push-to-Talk over Cellular (PoC); Signalling Flows; PoC Release 1.0; Signalling Flows V1.1.4 (Oct. 2003).

Push-to-talk over Cellular (PoC); Architecture; PoC Release 1.0, Architecture V.1.1.1 (Oct. 2003).

Push-to-Talk over Cellular (PoC); User Requirements; PoC Release 1.0; User Requirements V1.1.1 (Oct. 2003).

Office Action dated Apr. 20, 2010 from corresponding Canadian Patent Application No. 2,498,996.

Push to Talk Over Cellular (POC): List Management and Do-Not-Disturb; POC Release 1.0 (List Management and Do-not-Disturb V1.1.3 (Aug. 2003) Technical Specification Ericsson, Motorola, Siemens, Nokia) ftp://ftp.comptek.ru/pub/Dialogic/POC/PoC-List_Management-1.1.3.pdf.

* cited by examiner

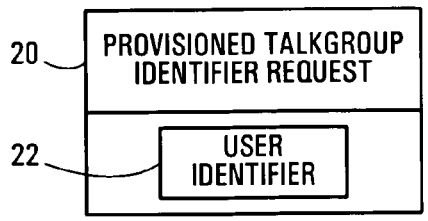
FIG. 3A
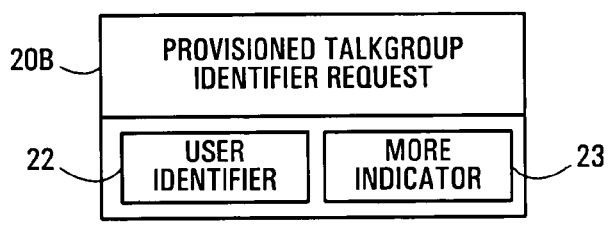
FIG. 3B
FIG. 3C
FIG. 3D

| TALKGROUP IDENTIFIER 50 | RESULT 51 |
|---|---|
| 1 | S |
| 2 | F |
| 3 | F |
| 4 ← TALKGROUP IDENTIFIER TO TEST 54 | NULL |
| ⋮ | ⋮ |
| 254 | NULL |
| 255 | NULL |

METHOD, SYSTEM, AND DEVICE FOR PROVISIONED TALKGROUP IDENTIFIER DISCOVERY

FIELD OF THE INVENTION

The invention relates to wireless communication systems and more particularly to providing provisioned talkgroup identifier information to user devices.

BACKGROUND OF THE INVENTION

In wireless communication systems which provide group call dispatch services, a user device may have a number of talkgroups which it may join in an active session. The specific predetermined talkgroups which the user device is permitted to join are known as the provisioned talkgroups of the user device. Each talkgroup is identified by a talkgroup identifier or talkgroup ID which often takes the form of an index. In order for a user using the user device to join a talkgroup, the user typically must input the particular talkgroup identifier of the provisioned talkgroup the user wants the device to join.

An example of a system providing group call dispatch services is the iDEN™ system of Motorola™ which provides dispatch services including walkie-talkie-like functionality such as Push-to-Talk™ (PTT™). When referred to herein, walkie-talkie functionality and half-duplex communication functionality which at any one time is capable of transmitting voice communication from a talking or transmitting party's device to a listening or receiving party's device, but cannot simultaneously transmit voice communication from the receiving party's device to the talking party's device, while the talking party's device is transmitting voice to the receiving party's device.

SUMMARY OF THE INVENTION

The present invention provides a method, system, and user device for provisioned talkgroup identifier discovery in a dispatch or similar network, in which a user is provided with a list of talkgroups provisioned for the user device. In some embodiments a new request message sent from the user device is implemented to effect a response from the network providing the information. In other embodiments the provision of the information is provided by a new message automatically sent from the network to the user device at a specific time. In yet other embodiments, the mobile unit attempts to join every group to test which groups are provisioned for it.

According to one broad aspect, the invention provides a user device capable of walkie-talkie-like functionality adapted to participate in dispatch calls through a dispatch network, the user device being further adapted to obtain from the dispatch network a respective provisioned talkgroup identifier for each talkgroup provisioned for the user device, and to make information pertaining to the provisioned talkgroup identifiers available to a user of the user device.

According to another broad aspect, the invention provides a dispatch network adapted to provide dispatch services to user devices capable of walkie-talkie-like functionality, the dispatch network being adapted to provide to each user device a respective provisioned talkgroup identifier for each talkgroup provisioned for the user device.

According to another broad aspect, the invention provides a method of provisioned talkgroup discovery comprising: a user device capable of walkie-talkie-like functionality transmitting a request to a dispatch network; the dispatch network receiving the request and responding with a response containing a respective provisioned talkgroup identifier for each talkgroup provisioned for the user device; and the user device receiving the response and making the provisioned talkgroup identifiers available to a user of the user device.

According to yet another broad aspect, the invention provides a memory for storing data for access by a user device of a dispatch network, comprising: a data structure stored in said memory, said data structure being a message containing a provisioned talkgroup identifier for each talkgroup provisioned for the user device.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which:

FIG. 3A is a block diagram representation of a datagram according to another embodiment of the invention for the provisioned talkgroup identifier request;

FIG. 3B is a block diagram representation of a datagram according to a further embodiment of the invention for the talkgroup identifier list update message;

FIG. 3C is a block diagram representation of a datagram according to another embodiment of the invention for the provisioned talkgroup identifier request;

FIG. 3D is a block diagram representation of a datagram according to a further embodiment of the invention for the talkgroup identifier list update message;

FIG. 9 is a block diagram representation of a talkgroup test memory store according to another embodiment of the invention for organizing and storing success or failure of join group requests by the user device by talkgroup identifier.

DETAILED DESCRIPTION OF THE PREFERRED EMBODIMENTS

A user of a user device is normally informed of the user device's provisioned talkgroups and provided with a list of the talkgroup identifiers in the form of indices at the time of service activation (activation occurring once, when a user initially subscribes to the service). However, it may be the case that a user is unaware of or forgets the user device's provisioned talkgroups and the identifiers thereof.

A user who is unaware of or forgets after service activation the provisioned talkgroup identifiers of the user's device can call a carrier customer call center and ask for the list. Another opportunity to obtain the list may be afforded a user who calls the carrier customer call center to subscribe to an additional group.

This may cause frustration and delays and is increasingly problematic as the number of provisioned talkgroups for the user device increases.

Embodiments of the present invention attempt to mitigate the inconvenience and/or inefficiency caused by a user only being informed of his/her provisioned talkgroup IDs during service activation or when he or she contacts a carrier customer care center. In accordance with the preferred embodiments discussed below, methods, systems and a novel user device, may be used to automatically provide a user of the user device a list of provisioned talkgroup IDs, or otherwise provide the user device with an identification of the provisioned talkgroup identifiers. In preferred embodiments of the invention, this information is retrieved over-the-air (OTA). While PTT™ networks and wireless devices are employed in the examples described below, more generally embodiments of the invention are applicable in the context of any networks and wireless devices participating in network delivered walkie-talkie-like communications, PTT being but one example. A network capable of delivering this will be referred to as a "dispatch network".

Figure 1:
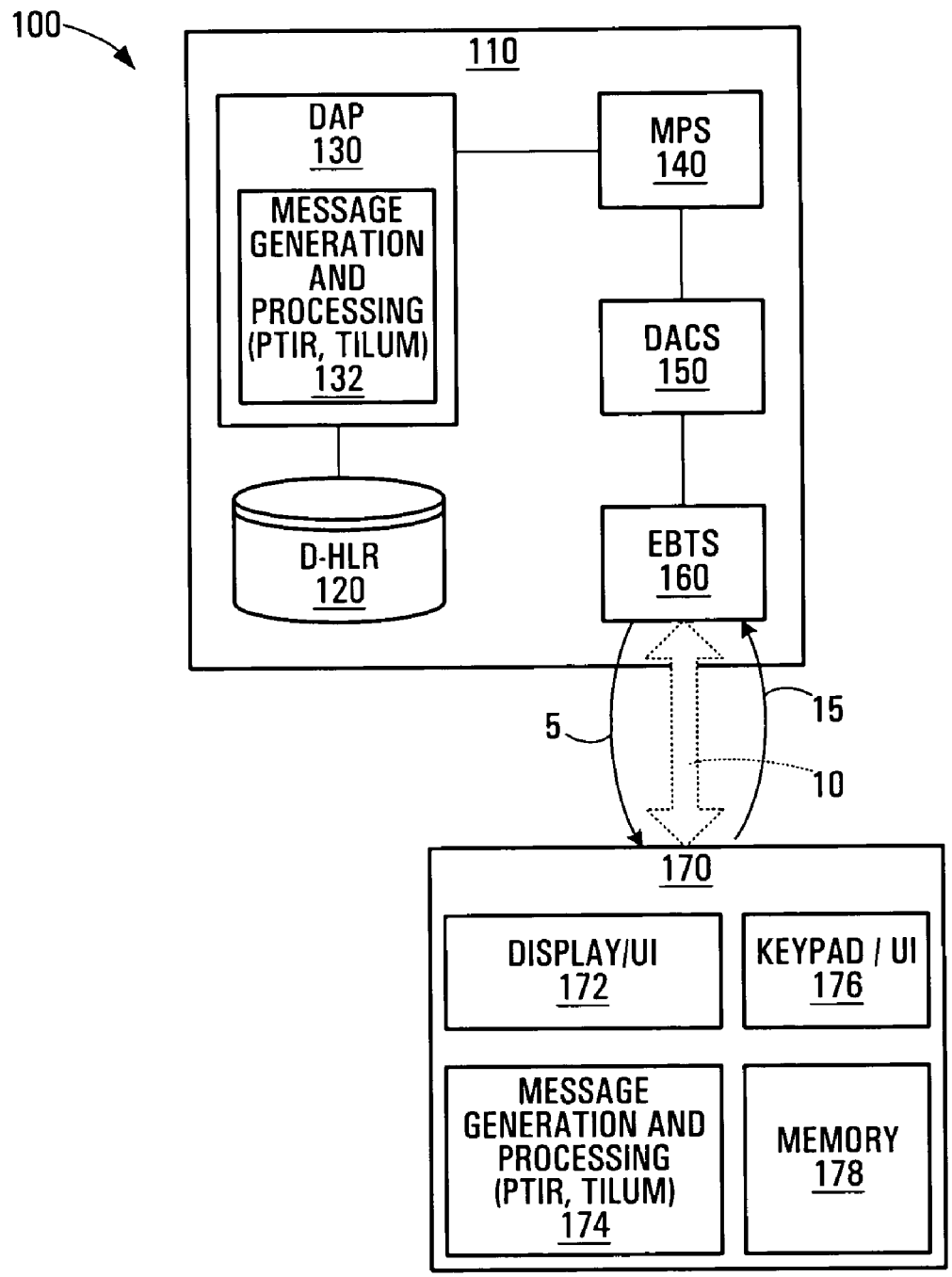
FIG. 1 is a block diagram depicting elements of a communications system participating in provisioned talkgroup identifier discovery according to an embodiment of the invention.

Referring to FIG. 1, elements of a communications system participating in provisioned talkgroup identifier discovery according to an embodiment of the invention, will now be discussed.

A communications system, generally shown by reference numeral 100, is depicted in FIG. 1, and is a modified iDEN™ system which includes a dispatch network 110 and user device 170 adapted in accordance with one possible implementation of the invention. In the implementation depicted in FIG. 1, the user device 170 is a wireless user device. The dispatch network 110 provides dispatch services including push-to-talk (PTT™) dispatch group calling services. A dispatch application processor (DAP) 130 is the processing entity responsible for the overall coordination and control of dispatch services in the iDEN™ system. The DAP 130 is coupled to a dispatch home location register (D-HLR) 120 which is a repository of data for dispatch calling identification and services. In some implementations the D-HLR 120 is resident on the DAP 130. The DAP 130 is coupled to a metro packet switch (MPS) 140 which is in turn coupled to a digital access cross connect switch (DACS) 150. The DACS 150 in turn is coupled to an enhanced base transceiver station (EBTS) 160. The EBTS 160 communicates with user devices over the air (OTA), and in the dispatch network, over outbound and inbound half-duplex voice communication channels 5 and 15 respectively, over a dedicated control channel (DCCH) 10, and over other existing channels (not shown). As will be discussed below, various embodiments of the invention use the DCCH 10 to send and receive messages associated with provisioned talkgroup identifier discovery. In the course of providing coordination and control of dispatch calls, the DAP 130 may retrieve information from the D-HLR 120 regarding the various services and or identifications including provisioned and selected talkgroups of a user device at any one time. In the course of communicating with the user device, the DAP 130 sends messages via the MPS 140, the DACS 150, and the EBTS 160 in order to interact with the user device 170.

According to an embodiment of the invention, the DAP 130 also has message generating and processing 132 which is adapted to respond to a PTIR (provisioned talkgroup identifier request) with a TILUM (talkgroup identifier list update message), both described in detail below. In a preferred embodiment, the message generation and processing 132 is implemented as a change to software already implemented on the DAP 130, but it may be implemented as separate software, hardware, firmware or a combination of these types of functionality. FIG. 1 shows a very specific example of network functionality which provides dispatch communications services. The arrangement of FIG. 1 is particularly suitable for iDEN™ applications. It is to be clearly understood that other network side implementations may be employed for delivering the talkgroup identifier discovery methods described herein. These other implementations may be specific to iDEN™ or to other dispatch service implementations. The dispatch service may of course include additional system components not shown in FIG. 1.

In the illustrated example, the user device 170 has a display 172 or other user interface for presenting information to a user including but not limited to the talkgroup identifiers, and has a keypad 176 or other user interface for receiving input from the user including but not limited to a request for updating the talkgroup identifiers. Also shown is message generation and processing 174 which is responsible for generating the PTIR, and for processing a TILUM received in response to the request. In a preferred embodiment, the message generation and processing 174 is implemented as a change to software already implemented on the user device, but it may be implemented as separate software, hardware, firmware or a combination of these types of functionality. Finally, a memory 178 is shown in which is stored the list of talkgroup identifiers. Preferably, this is part of memory already implemented on the user device. FIG. 1 shows a very specific implementation for a user device capable of implementing the talkgroup identifier discovery methods provided by embodiments of the invention. It is to be clearly understood that the particular arrangement of components of FIG. 1 is only one example. The user device may of course include additional components not shown in FIG. 1.

Figure 2:
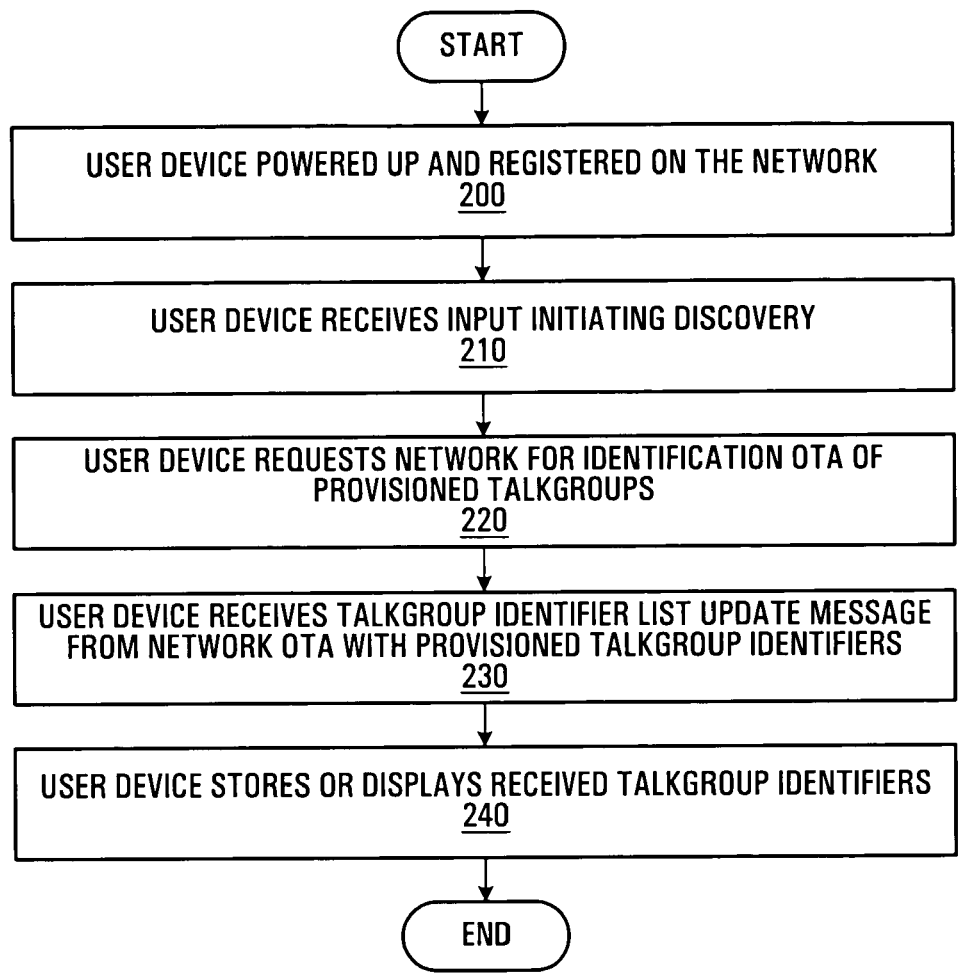
FIG. 2 is a flow diagram illustrating the steps performed by the user device for provisioned talkgroup identifier discovery according to one network query based embodiment of the invention.

Referring now to FIG. 2, the steps performed by the user device for provisioned talkgroup identifier discovery (PTID) according to one network query based embodiment of the invention, will now be discussed.

In this network query based embodiment, the communications system provides to the user device identifiers of the talkgroups in response to a query or request. In this embodiment the user device initiates PTID, however both the user device and the network are adapted to participate in PTID.

At step 200, a user device is powered up, and registered with the network. For example if the system is an IDEN™ system there is a standard procedure for doing this. In the case where a user has forgotten or lost the identification of the talkgroups the user's device has provisioned, the user can initiate the process of PTID by making a selection from the user device user interface which could include but is not limited to a menu selection, a press of a button, or otherwise any other input which is adapted to indicate to the user device that the user wishes to initiate PTID. This occurs at step 210 in which the user device receives input initiating discovery via a user interface. At step 220 the user device requests an identification over the air of provisioned talkgroups for example by transmitting a PTIR message. In an IDEN™ system this request might be processed by a DAP for example. The user device does this by sending a datagram or request message which may take a form similar to the example format depicted in FIG. 3A described in more detail below. Preferably the datagram associated with the embodiment of FIG. 2 includes an identification that the request message is a request for information listing all of the provisioned talkgroups of the user device, and also preferably includes an identification of the user device for helping the network retrieve the proper information. The next step the user device performs is the receipt of a response from the network, for example a TILUM, which may take a form similar to that of the example format depicted in FIG. 3B described in more detail below. In a preferred embodiment, the message sent by the network to the user device in step 230 includes the list of talkgroup identifiers provisioned for the particular user device. Once the user device has received the identification of the provisioned talkgroups, the user device at step 240 may store or display the received talkgroup identifiers. In a preferred embodiment the user may be able to select whether or not the information is stored or displayed or both. Although there are many ways in which a number of identifiers may be displayed, according to a preferred embodiment the list is displayed on a visual user interface which could for example be an LCD display. More generally, information pertaining to the provisioned talkgroup identifiers is made available to a user of the device. For example, according to yet another preferred embodiment, the user device has a stored address book or alias list which may for example be provided by the user or a carrier, which may be used to store a name associated with each talkgroup identifier, which may often comprise a number. The name is preferably a more human friendly term which is descriptive of the talkgroup's function or members. Example talkgroup identifiers are discussed in more detail in association with other various embodiments of the invention.

In an additional embodiment, a dispatch network (for example, but not limited to that depicted in FIG. 1) and particularly a user device (for example, but not limited to that depicted in FIG. 1), are adapted to respectively support and perform the functions illustrated in the steps of the flow diagram of FIG. 2.

Referring to FIG. 3A, an example of a datagram which may be used for the provisioned talkgroup identifier request, will now be discussed. The particular request is generally indicated by 20. The message indicates inherently or explicitly to the network what is requested, and by the inclusion of a user identifier 22 (for example an urban fleet member id (UFMI) for iDEN™ systems), communicates to the network the particular user device which is requesting a list of provisioned talkgroups. According to some embodiments of the invention, the PTIR 20 is a new message defined within an existing communications system itself, like the iDEN™ system. In a preferred embodiment in which the system itself is modified, the PTIR 20 message could be a new layer 3 message adapted for a dedicated control channel (DCCH).

The PTIR message is sent over an implementation specific control, messaging or traffic channel to effect delivery and a response to the request. In the event the channel is also device specific, it is not necessary to include a user identified as the network can figure that out from the channel over which the request is received.

Referring to FIG. 3B, an example of a datagram which may be used for a TILUM is generally indicated by 30. The message 30 indicates inherently or explicitly to the user device what the message is, and includes a list of all provisioned talkgroup identifiers 32 of the user device, provides to the user device the information it requested. In the structure illustrated, the TILUM 30 has a fixed size. This is achieved by padding the structure with NULL entries 35 until the fixed size is ready. In an embodiment implementing the fixed size, the number of possible values which can be stored in the TILUM 30 is equal to the maximum number of talkgroups that may be provisioned for a single user device. A fixed size TILUM does have the drawback of wasting bandwidth for NULL entries 35 in the list while at the same time avoiding processing which may be required for variable length TILUMs of other embodiments. In preferred embodiments, the TILUM is of variable size, including a field (not shown) to indicate the size or number of entries in the list, the entire structure being large enough to contain the list. In a variable size TILUM containing the same list as that shown in FIG. 3B, the entries of NULLs 35 in FIG. 3B would not be included and information indicating the size of the list would be included in an additional field. The particular structures used to effect useful transmission of the provisioned talkgroup identifiers will depend upon the capacities of the particular system in which it is implemented and the nature of the identities themselves. According to some embodiments of the invention, the TILUM 30 is a new message defined within an existing system, like the iDEN™ system. In a preferred embodiment in which the system itself is modified, the TILUM 20 message in the iDEN™ system could be a layer 3 message adapted for a dedicated control channel (DCCH).

The TILUM is sent over an implementation-specific control, messaging or traffic channel to effect delivery and receipt of the information requested by the user device.

Figure 4:
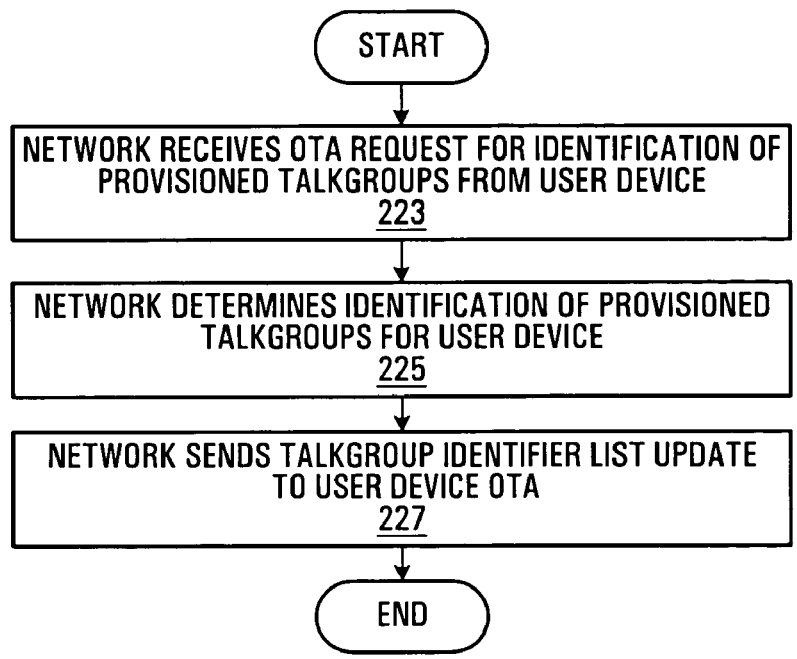
FIG. 4 is a flow diagram illustrating the steps performed by a network for provisioned talkgroup identifier discovery according to another network query based embodiment of the invention.

Referring to FIG. 4, the steps performed by a dispatch network for provisioned talkgroup identifier discovery according to another network query based embodiment of the invention will now be discussed. In this embodiment, the communications system provides to the user device identifiers of the talkgroups in response to a request.

The method begins at step 223 with the network receiving over the air a request for the identification of provisioned talkgroups from the user device (i.e. the network receives the PTIR). In an iDEN™ implementation, this might for example be received and forwarded to the DAP. In step 225, the network determines the identification of the provisioned talkgroups for the user device which generated the request. For example, in an iDEN™ implementation such as shown in FIG. 1, this may involve the DAP querying the D-HLR for this information. In step 227, the network sends the talkgroup identifier list update message to the user device over the air. This message might for example be generated by the DAP in iDEN™ implementations.

Referring now to FIGS. 3C and 3D, it should be noted that in some embodiments, a TILUM 30B which may contain a partial list of talkgroup identifiers is utilized to reduce the size of each message sent over the air. The TILUM 30B is arranged so that it is capable of containing a fixed number of provisioned talkgroup identifiers 32. This fixed number is preferably smaller than the largest number of talkgroups provisioned for any one user, but larger than the average number of talkgroups provisioned per user. Accordingly, in this embodiment, the TILUM 30B is a relatively smaller structure, providing storage for the fixed number of talkgroup identifiers 32, and including an additional "more indicator" field 33 which indicates whether the user has more talkgroups provisioned than that included in the TILUM 30B. Correspondingly, a PTIR 20B in such an embodiment may also include a "more indicator" 23 to indicate to the network that another set of talkgroup identifiers 32 in an additional TILUM 30B is required.

With regard to a method similar to that depicted in FIG. 4, in which a network utilizes TILUMs 30B with a "more indicator" 33, after receiving a PTIR 20B from the user device, the network generates a TILUM 30B containing a fixed number of talkgroup identifiers 32 along with a "more indicator" 33 indicating that more talkgroup identifiers 32 are to be provided.

With regard to a method similar to that depicted in FIG. 2, for a user device to utilize a TILUM 30B, if the "more indicator" 33 in the TILUM 30B received from the network indicates there are more talkgroup identifiers 32 to be provided, the user device makes another PTIR 20B of the network.

Similarly, in another embodiment, if the network receives a subsequent TILUM 30B within a certain period of time after sending a first TILUM 30B with a "more indicator" 33, the network sends a respective subsequent TILUM 30B containing a list of the next fixed number of talkgroup identifiers 32. The last TILUM 30B containing the last talkgroup identifiers 32 will have a "more indicator" 33 set to a value indicating that there is no more, and accordingly no subsequent PTIR 20B is sent to the network from the user device at that time.

Figure 5:
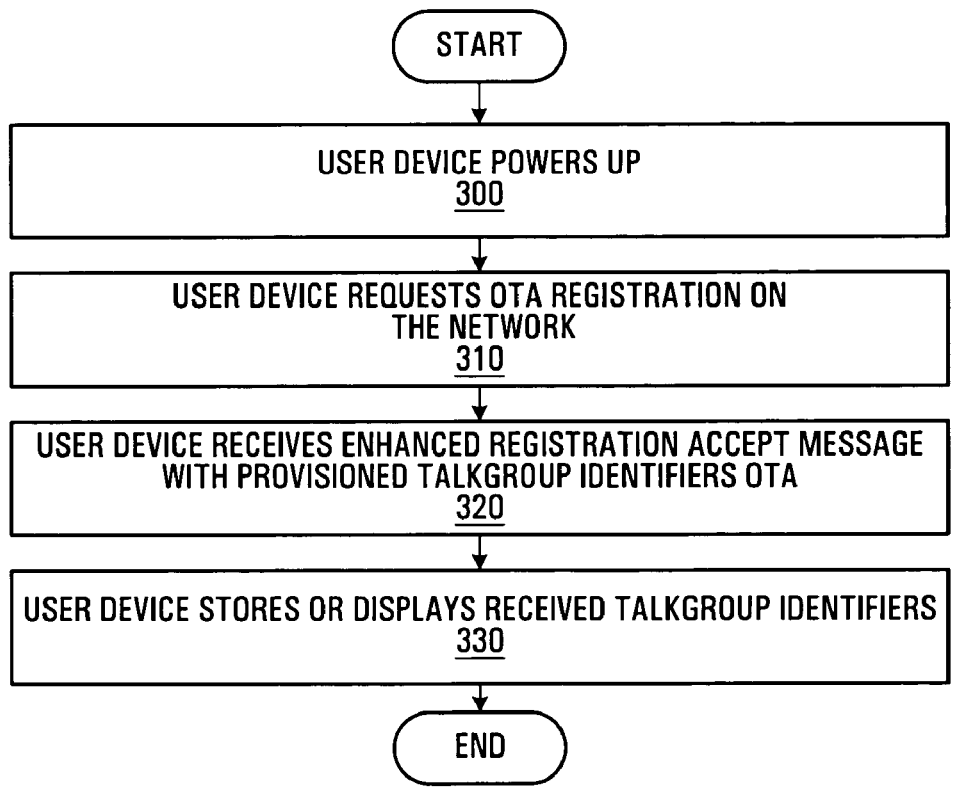
FIG. 5 is a flow diagram illustrating the steps performed by a user device for provisioned talkgroup identifier discovery according to a network registration based embodiment of the invention.

Referring to FIG. 5, the steps performed by a user device for provisioned talkgroup identifier discovery according to a network registration based embodiment of the invention, will now be discussed. In this embodiment, a communications system provides to the user device identifiers of the talkgroups every time the user device sends a network registration request.

This method starts with the user device powering up at step 300. At step 310 the user device requests registration on the network over the air. At step 320, the user device receives an enhanced registration accept message (or other appropriate registration acceptance message) which contains the provisioned talkgroup identifiers. Preferably, the provisioned talkgroup identifiers are appended to the registration accept message, and no portion of the conventional registration accept message is replaced. This message is received over the air. At step 330, the user device stores and/or displays the received talkgroup identifiers 330 for use by a user of the device.

Figure 6:
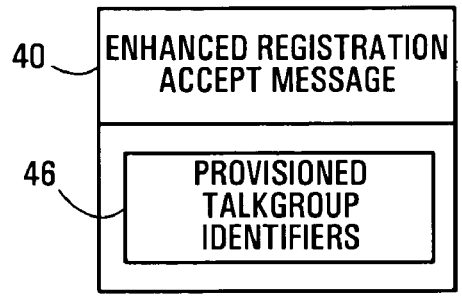
FIG. 6 is a block diagram representation of a datagram according to a further embodiment of the invention for the enhanced registration accept message.

Referring to FIG. 6, an example of a datagram according to a further embodiment of the invention for the enhanced registration accept message, will now be discussed.

The enhanced registration accept message, generally indicated at 40, includes a number of various identifiers and network variables for facilitating registration of communication with the user device and for verifying at the user device that registration was successful (not shown). It may include other types of fields which are conventional to a particular registration accept message within a system in which it is used. For this embodiment however, in addition to these types of fields, the message also includes the provisioned talkgroup identifiers 46, these not being included in conventional registration accept messages.

Figure 7:
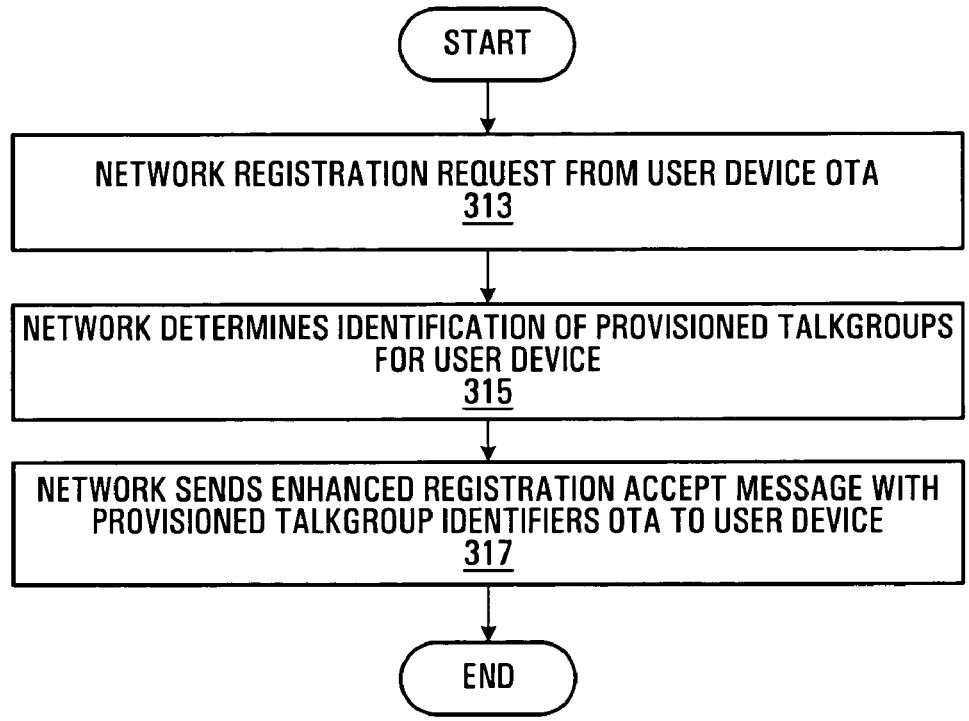
FIG. 7 is a flow diagram illustrating the steps performed by a network for talkgroup identifier discovery according to another network registration based embodiment of the invention.

Referring to FIG. 7, the steps performed by a network for talkgroup identifier discovery according to another network registration based embodiment of the invention, will now be discussed. In this embodiment a communications system provides to the user device identifiers of the talkgroups every time the user device sends a network registration request.

The method starts at step 313 with the network receiving a registration request from the user device over the air. More generally, any appropriate registration message might be received in this step. In an iDEN™ system, this message might be forwarded to the DAP. Next, at step 315, the network determines the provisioned talkgroups for the user device from which the registration request message was received. For example, in an iDEN™ implementation this might involve the DAP querying the D-HLR for this information. At step 317, the network sends an enhanced registration accept message containing the provisioned talkgroup identifier over the air to the user device. This message might for example be generated by the DAP if the network is an iDEN™ network.

Figure 8:
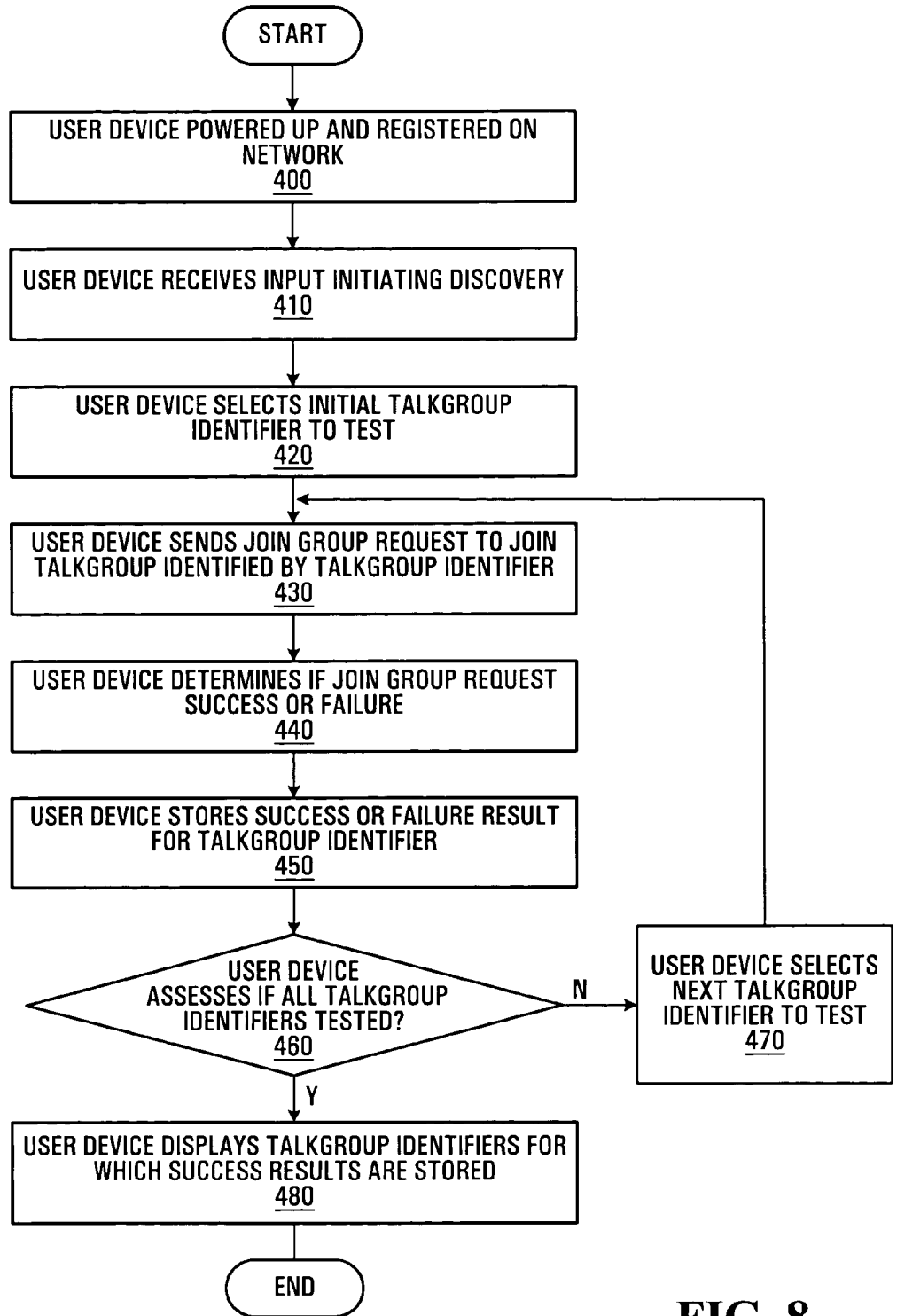
FIG. 8 is a flow diagram illustrating the steps performed by a user device for talkgroup identifier discovery according to one handheld based embodiment of the invention.

Referring to FIG. 8, the steps performed by a user device for talkgroup identifier discovery according to another embodiment of the invention, will now be discussed. In this embodiment, the user device determines the identifiers of the talkgroups by automatically attempting to join various talkgroups, and storing the results by talkgroup identifier. In this embodiment, there is no requirement to make any changes whatsoever on the network side. The method is entirely implemented in the user device.

The method begins at step 400 with the user device powering up and registering with the network. At step 410, the user device receives an input requesting the initiation of talkgroup identifier discovery. This input might be from a user of the device via any appropriate user interface. Alternatively, the input might be simply the powering on of the device as took place at step 400. At step 420, the user device selects an initial talkgroup identifier to test. At step 430, the user device sends a join group request message to join the talkgroup identified by the talkgroup identifier. A "Join group request" message is a message particular to the iDEN™ standards. Any other appropriate message for joining a particular talkgroup can alternatively be employed in different systems. At step 440, the user device determines whether or not the join group request method resulted in success or failure from the indication of registration success or failure in the registration accept message returned to the user device. At step 450, the user device stores information sufficient to identify whether a particular talkgroup is a provisioned talkgroup or not. This might for example involve storing for each talkgroup an indication of whether or not the request resulted in success or failure. Alternatively, the user device may simply store the talkgroup identifiers for the talkgroups which were successful. At step 460, if the user device has not assessed all of the talkgroup identifiers available for testing (no path) then at step 470 the user device selects a next talkgroup identifier to test and continue with the method at step 430. On the other hand, if at step 460 it is determined that all of the talkgroup identifiers have been tested, then at step 480 the user device displays and/or stores the talkgroup identifiers for which success results were achieved.

Referring to FIG. 9, a talkgroup test memory store according to another embodiment of the invention for organizing and storing success or failure of join group requests by the user device by talkgroup identifier, will now be discussed.

In the example of FIG. 9, a test memory store is shown having two columns 50,51. Column 50 contains the talkgroup identifiers, and column 51 contains the results for a corresponding talkgroup identifier. In the illustrated example, there are 255 possible talkgroup identifiers labelled 1 through 255. The results 51 are indicated by either an S for success or an F for failure. For a talkgroup which has not yet been tested, a null indication is indicated. In the illustrated example, talkgroup identifiers 1,2,3 indicated by 52 have been tested, and talkgroup identifier 4 is the next talkgroup identifier to test 54. It is to be understood that the structure of FIG. 9 is only one particular example. Any appropriate information can be stored which will allow an identification of which talkgroups resulted in success. For example, if the table includes an entry for every possible talkgroup, then it would not be necessary to include an entry for the talkgroup identifier since that could be synonymous with the particular memory location.

In some embodiments, a variable size test memory store (not shown) similar to the test memory store of FIG. 9 is utilized. The variable size test memory store is a variable sized list of talkgroup identifiers and includes an extra field which stores a value indicative of the size of the list or the number of entries in the list which correspond to talkgroup identifiers for which the join group request was successful. In such an embodiment, the variable size test memory store does not include any NULL pointers or failed talkgroup identifiers.

In some embodiments, the test memory store of FIG. 9 may be updated or refreshed at any time upon the user initiating a subsequent request for the provisioned talkgroup id's.

In yet another embodiment, no specific PTIR is generated by the user device. Rather, on the network side, every time the user device connects to the network the network voluntarily generates the TILUM and sends this to the user device. In another embodiment, if there is any change to the list of talkgroups provisioned, a TILUM or an additional TILUM is generated.

In other embodiments, the method and system are adapted to provide peripheral support for a wired device which is capable of participating in wireless sessions with various talkgroups, and which has a number of talkgroups provisioned for it. Such a wired device participates via a network interworking function, so that although the wired device is not within the wireless network, it appears as though it is, and participates in a group call like a wireless device. Hence, according to these embodiments, the wired user device is provided with a list of talkgroups which have been provisioned for the device. For these embodiments, talkgroup discovery occurs in a manner analogous to the manner described hereinabove. Hence, a wired user device may request or be delivered the talkgroup indexes which are provisioned for it.

Numerous modifications and variations of the present invention are possible in light of the above teachings. It is therefore to be understood that within the scope of the appended claims, the invention may be practiced otherwise than as specifically described herein.

We claim:

1. A user device capable of walkie-talkie-like functionality configured to participate in dispatch calls through a dispatch network, the user device being further configured to:
   obtain from the dispatch network a user-device specific set of at least one provisioned talk group identifier having a respective provisioned talkgroup identifier for each talkgroup provisioned for the user device; and
   make information pertaining to the at least one provisioned talkgroup identifier available to a user of the user device, the at least one provisioned talkgroup identifier being maintained by the dispatch network;
   wherein the user device is a wireless device comprising a message generation and processing function configured to:
      transmit a first message to the dispatch network to request the respective provisioned talkgroup identifier for each talkgroup provisioned for the user device; and
      receive at least a second message from the dispatch network containing the provisioned talkgroup identifier(s).

2. A user device according to claim 1 wherein the information pertaining to the provisioned talkgroup identifiers is selected from a group consisting of:
   the provisioned talkgroup identifiers themselves;
   a respective corresponding name for each provisioned talkgroup identifier;
   a combination of some of the provisioned talkgroup identifiers themselves and a respective corresponding name for some of the provisioned talkgroup identifiers.

3. A user device according to claim 1 wherein the first and second messages are layer 3 messages.

4. A user device according to claim 1 comprising:
   a user interface for receiving an input from a user requesting that the first message be transmitted, and in response to which input transmits the first message.

5. A user device according to claim 1 configured to transmit the first message automatically upon being powered on.

6. A user device according to claim 1 which is compliant with an iDEN™ standard.

7. A user device according to claim 1 configured to obtain from the network a respective provisioned talkgroup identifier for each talkgroup provisioned for the user device by automatically trying to join each of a plurality of talkgroups that could possibly be provisioned, and maintaining a record of which talkgroups were successfully joined.

8. A system comprising at least one user device according to claim 1 in combination with
   the dispatch network configured to provide to each user device a respective provisioned talkgroup identifier for each talkgroup provisioned for the user device.

9. A system according to claim 8 wherein the dispatch network provides each user device the respective provisioned talkgroup identifiers in response to a request from the user device.

10. A system according to claim 8 wherein the dispatch network is configured to provide the user-device specific set of at least one provisioned talkgroup identifier upon an event other than talkgroup opt in.

11. A system comprising at least one user device according to claim 1 in combination with the dispatch network configured to provide to the at least one user device the respective provisioned talkgroup identifier for each talkgroup provisional for the user device.

12. A user device according to claim 1 wherein the user device is configured to receive the user-device specific set of at least one provisioned talkgroup identifier upon an event other than talkgroup opt in.

13. A dispatch network configured to provide dispatch services to user devices capable of walkie-talkie-like functionality, the dispatch network being configured to:
   maintain for each user device a user-device specific set of at least one provisioned talk group identifier having a respective provisioned talkgroup identifier for each talkgroup provisioned for the user device; and
   provide to each user device the user-device specific set of at least one provisioned talkgroup identifier upon an event other than talkgroup opt in;
   wherein the user devices are wireless devices and the dispatch network comprises a message generation and processing function configured to:
      receive a first message from a particular user device requesting the respective provisioned talkgroup identifier for each talkgroup provisioned for the user device; and
      transmit at least a second message containing the provisioned talkgroup identifier(s).

14. A dispatch network according to claim 13 configured to transmit a message containing the provisioned talkgroup identifier(s) to a given user device automatically upon power on of the given user device.

15. A dispatch network according to claim 13 comprising a dispatch controller, the dispatch server comprising:

a D-HLR (dispatch-home location register) maintaining for each user device a respective list of provisioned talkgroup identifiers; and a DAP (dispatch application processor) configured to process the first message to request the respective provisioned talkgroup identifier for each talkgroup provisioned for the user device to obtain the provisioned talkgroup identifiers from the D-HLR, and to transmit at least the second message containing the provisioned talkgroup identifier(s).

16. A dispatch network according to claim 15 further comprising at least one EBTS through which messages are routed between user devices and the dispatch application processor.

17. A dispatch network according to claim 13 configured to transmit a message containing the provisioned talkgroup identifier(s) to a given user device automatically whenever there has been a change in the provisioned talkgroup identifier(s) of the given user device.

18. A method of provisioned talkgroup discovery in a system comprising a dispatch network and a plurality of user devices, the method comprising:

the dispatch network maintaining for each user device a user-device specific set of at least one provisioned talk group identifier having a respective provisioned talkgroup identifier for each talkgroup provisioned for the user device;

a user device of the plurality of user devices being a wireless device capable of walkie-talkie-like functionality transmitting a request to the dispatch network for the user-device specific set of at least one provisioned talk group identifier;

the dispatch network receiving the request and responding with a response containing the user-device specific set of at least one provisioned talk group identifier; and the user device receiving the response and making the provisioned talkgroup identifiers available to a user of the user device.

19. A method according to claim 18 further comprising:

the user device receiving an input from a user in response to which input the request is transmitted.

20. A method according to claim 18 wherein the request and response are sent using layer 3 messages.

21. A method according to claim 18 wherein the request is a registration request and the response is an enhanced registration accept message.

* * * * *

UNITED STATES PATENT AND TRADEMARK OFFICE
CERTIFICATE OF CORRECTION

| | | |
|---|---|---|
| PATENT NO. | : 7,840,192 B2 | Page 1 of 1 |
| APPLICATION NO. | : 10/787302 | |
| DATED | : November 23, 2010 | |
| INVENTOR(S) | : Padakandla Krishna Rao | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1752 days.

Signed and Sealed this
Eighteenth Day of October, 2011

David J. Kappos
*Director of the United States Patent and Trademark Office*